June 15, 1965     L. W. MARSH, JR     3,189,835
PULSE RETIMING SYSTEM
Filed May 1, 1961     3 Sheets-Sheet 1

*INVENTOR.*
LYNN W. MARSH, JR.

ATTORNEYS

June 15, 1965  L. W. MARSH, JR  3,189,835
PULSE RETIMING SYSTEM
Filed May 1, 1961  3 Sheets-Sheet 2

INVENTOR.
LYNN W. MARSH, JR.

ATTORNEYS

United States Patent Office 3,189,835
Patented June 15, 1965

3,189,835
PULSE RETIMING SYSTEM
Lynn W. Marsh, Jr., Marblehead, Mass., assignor to Anelex Corporation, Boston, Mass., a corporation of New Hampshire
Filed May 1, 1961, Ser. No. 106,840
6 Claims. (Cl. 328—63)

My invention relates to electronic data processing apparatus, and particularly to an improved system for retiming randomly occurring pulses to establish a precise phase relationship with a clock pulse stream.

High speed data processing and recording equipment has been developed which has a large capacity for information in the form of electrical pulses. Generally speaking, the necessary programming and switching operations carried out in such equipment are controlled by a precisely timed stream of "clock" pulses from an oscillator or the like. It is a relatively simple matter to control pulse information which is generated within the equipment in synchronism with one or more clock pulses. However, it is frequently desirable to process information in the form of pulses which have no fixed time relationship to the clock pulse stream. For example, in electrically controlled data printers it is necessary to provide a print pulse after the paper is in position and information for a new line of print is in place, which pulse has no necessary phase relation to a pulse stream of fixed repetition rate. In accordance with my invention, randomly occurring pulses of this kind are retimed; that is, a new pulse is generated for each randomly occurring input pulse. The new pulses are each precisely phased with respect to the nearest clock pulse. A specific feature of the invention is that input pulses occurring midway between clock pulses are always retimed to agree with one or the other of the adjacent clock pulses without ambiguity, loss of information, or double pulsing.

In practicing my invention, in accordance with a specific embodiment thereof, I provide means for generating several series of auxiliary pulses having a particular set of relationships to the clock pulses. Specifically, I thus provide a group of successive pulses associated with each pair of clock pulses, each group comprising a first pair of pulses employed to determine the time of arrival of a randomly occurring input pulse relative to the associated clock pulses, and a second pair of generating pulses, one of which is selected for use to generate a retimed pulse having a specific phase relationship to the one of the associated clock pulses selected by the first pair of pulses.

A precise pulse generator is connected to respond to the randomly occurring input pulses by generating, in response to each input pulse, a pulse having a duration equal to the time spanned by the first and last auxiliary pulse of the group associated with each pair of clock pulses. The output of this pulse generator is connected to gates controlled by the auxiliary pulses such that one of the generating pulses of the auxiliary group is gated to the output for each applied input pulse.

The structure and mode of operation of the pulse retiming system of my invention will best be understood by reference to the accompanying drawings, together with the following description, of a particular embodiment thereof.

Figure 1:
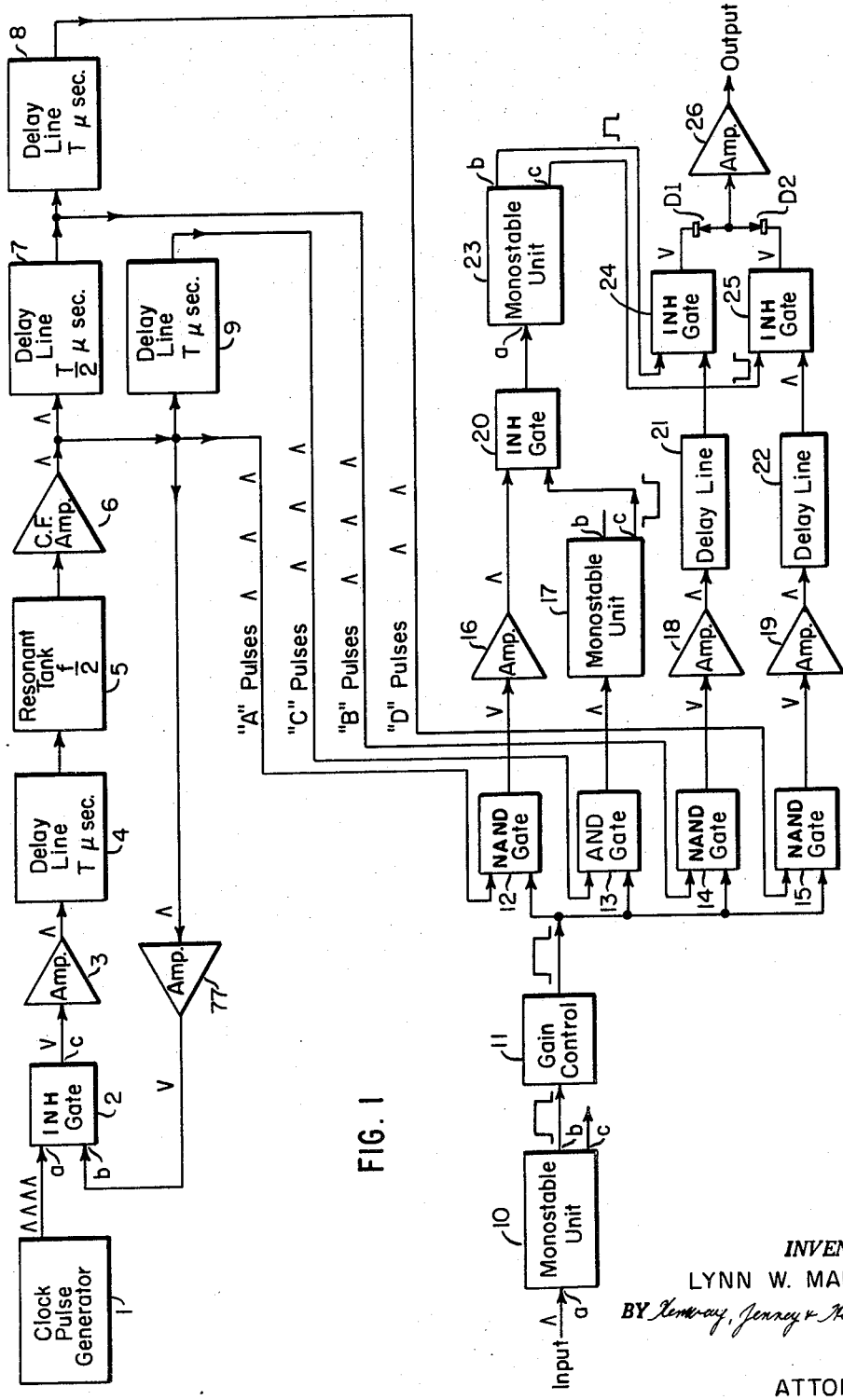
FIGURE 1 is a schematic wiring diagram of a pulse retiming system in accordance with one embodiment of my invention.

Referring now to FIG. 1, the disclosed embodiment of my invention comprises a clock pulse generator 1 connected to an auxiliary pulse generating system comprising an inhibiting gate 2, an amplifier 3, a delay line 4, a tank circuit 5, a cathode following amplifier 6, and additional delay lines 7, 8 and 9. The purpose of this group of units, which will be described in detail below, is to generate a set of auxiliary pulses having predetermined time relations to the clock pulses. Comparing FIG. 1 with FIG. 5, the A pulses correspond to every other clock pulse, the C pulses correspond to the intermediate clock pulses, the B pulses occur between the A and C pulses, and the D pulses occur between each C pulse and the next succeeding A pulse. Thus, the A and C pulses may be considered to be streams at half the repetition rate of the clock pulse train which are derived by selecting odd and even clock pulses, respectively. It will be seen in FIG. 5 that each pair of pulses such as 1 and 2, 3 and 4, 5 and 6, etc., is associated with a group of auxiliary pulses A, B, C and D.

Returning now to FIG. 1, the input pulses are applied to a monostable unit 10, to be described in detail below, which functions to provide an elongated pulse of a precise duration, sufficient to span one group of auxiliary pulses A through D, for each input pulse. This duration should be at least one and one half, and less than two and one half, times the clock pulse period. It is assumed that the input pulses are, or are made to be, of the same duration as a single clock pulse.

Monostable unit 10 is connected to a plurality of NAND gates 12, 14 and 15, and a NAND gate 13, through a suitable gain control unit 11 which may optionally be provided to adjust the output of the monostable unit to the input requirements of the gates. For example, gain control 11 may comprise a conventional amplifier.

Gates 12, 13, 14 and 15 control the transmission of the auxiliary pulses in a manner which will be discussed in more detail below. Briefly however, gate 12 has its output connected through an inverting amplifier 16 to one input of inhibiting gate 20. Gate 13 has it output connected to the input of a monostable unit 17, which operates as a pulse stretcher, and which has its output connected to the other input of inhibiting gate 20. As will be seen from the relative polarities indicated on the drawing, gate 20 functions to produce an output only if gate 12 is operated and gate 13 has not operated. Gate 20 is connected to a monostable unit 23, which has two outputs of opposite polarity which are reversed if an input pulse is applied to the unit.

Gates 14 and 15 are connected through inverting amplifiers 18 and 19, respectively, and delay lines 21 and 22, respectively, to the input terminals of inhibiting gates 24 and 25, respectively. The other inputs to inhibiting gates 24 and 25 are supplied by the outputs of monostable unit 23.

The outputs of gates 24 and 25 are connected through any suitable isolating network, here shown as a pair of oppositely poled diodes D1 and D2, to the input of an output amplifier 26. As will appear, the function of the system of FIG. 1 is to produce an output pulse for each input pulse having a precise phase relationship to the nearest one of the nearest pair of clock pulses.

Before describing the system of FIG. 1 in further detail, the details of various component units will be described.

A number of the units of FIG. 1 require little description, since they are conventional in nature. For example, clock pulse generator 1 may comprise any suitable conventional precision oscillator followed by conventional pulse shaping circuits and a clamp, if necessary, to eliminate pulses of unwanted polarity. Amplifiers 3, 16, 18, 19, 26 and 77 may be of any suitable conventional design in which the input is inverted, and cathode following amplifier 6 may be of any suitable conventional design which does not invert the phase of the applied signal.

Monostable units 10, 17 and 23 may also be conventional, and for example, could be any suitable conventional one-shot multivibrator, which provides a rectangular output pulse of determinable pulse length following an applied input pulse. In accordance with a preferred embodiment of my invention, however, a monostable unit of the type shown in FIG. 2 is employed.

Figure 2:
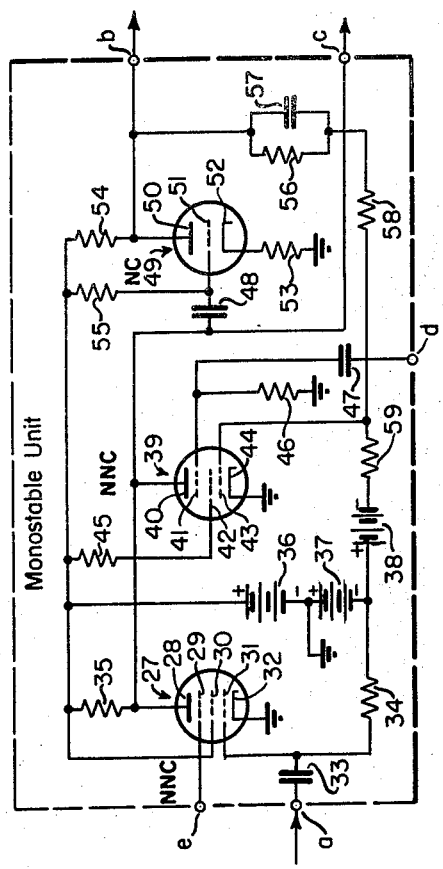
FIGURE 2 is a schematic wiring diagram of a monostable unit which can be employed in the system of FIG. 1.

Referring now to FIG. 2, the monostable unit has been indicated as a block surrounded by a dotted line having various terminals which have been indicated by reference characters. It will be seen from FIG. 1 that all of the terminals are not employed in the various stages of FIG. 1, but the reference characters applied to the terminals of the units shown in FIG. 1 correspond to those of the FIG. 2 device which are employed.

The monostable unit of FIG. 2 comprises three vacuum tubes 27, 39 and 49. Tube 27 is provided with an anode 28, a first control electrode 29, a screen electrode 30, a second control electrode 31, and a cathode 32, which is grounded as shown. The anode 28 of tube 27 is returned to a suitable source of bias voltage such as a battery 36 through a plate dropping resistor 35. The first control electrode 29 is connected to an input terminal $e$ of the monostable unit for purposes to be described. The second control electrode 31 of tube 27 is biased by conventional means such as a battery 37 having its positive terminal grounded as shown, and its negative terminal connected through a suitable grid resistor 34 to control electrode 31. Control electrode 31 is also connected to input terminal $a$ of the unit through a coupling capacitor 33. Screen electrode 30 is returned to the positive terminal of battery 36 in a conventional manner.

Vacuum tube 39 is provided with an anode 40, a screen electrode 42, a first control electrode 41, a second control electrode 43, and a cathode 44, the latter being grounded as shown. The screen electrode 42 is returned to the positive terminal of battery 36 through a suitable resistor 45. The anode 40 of tube 39 is connected to the anode of tube 27. The first control electrode 41 of tube 39 is returned to ground through a suitable biasing resistor 46, and is also connected to an external terminal $d$ through a suitable coupling capacitor 47 for purposes which will be described below. The second control electrode 43 is connected to a potential divider which will be described in more detail below.

Vacuum tube 49 has an anode 50, a control electrode 51, and a cathode 52, the latter being returned to ground through a suitable cathode resistor 53. The anode of tube 49 is returned to the positive terminal of battery 36 through a suitable plate resistor 54. The control electrode 51 of tube 49 is returned to the positive terminal of battery 36 through a suitable voltage dropping resistor 55, and is also coupled to the anodes of tubes 27 and 39 through a suitable coupling capacitor 48. An output terminal $c$ is also connected to the anodes of tubes 27 and 39, for purposes which will appear.

The anode 50 of tube 49 is connected to an output terminal $b$, and is also connected to ground through a potential divider which will next be described. This potential divider comprises a first resistor 56 in parallel with a bypass capacitor 57, this combination being connected in series with a resistor 58, a resistor 59, and through batteries 38 and 37 to ground. The second control electrode 43 of tube 39 is connected to the junction of resistors 58 and 59 as shown. In operation, tube 49 is normally conducting, and its anode 50 is accordingly at a relatively low potential because of the voltage drop through resistor 54. Consequently, the voltage at the junction of resistors 58 and 59 is also a relatively low value, holding the second control electrode 43 of tube 39 to a potential sufficient to cut off tube 39. Tube 27 is cut off by the negative bias potential supplied to its second control electrode 31 through resistor 34. The anodes 28 and 40 of tubes 27 and 39, and output terminal $c$, are accordingly at a potential substantially equal to the positive potential of battery 36. At this time, coupling capacitor 48 is essentially fully charged.

With the unit in the state just described, assume that a positive pulse is applied between input terminal $a$ and ground. This pulse will be coupled through capacitor 33 to control electrode 31 and, if of sufficient magnitude, will cause tube 27 to conduct, thus tending to decrease the potential on its anode 28. As the anode potential drops, capacitor 48 will couple the change of potential, lowering the potential on control electrode 51 of tube 49. This action will cause tube 49 to cut off, raising the potential of its anode 50. Increase in the potential of anode 50 of tube 49 will cause an immediate increase in the voltage applied to control electrode 43 of tube 39, causing it to conduct, and thus further lowering the potential on the anodes 28 and 40 of tubes 27 and 39, and holding control electrode 51 below cut-off potential. At the end of the input pulse applied to terminal $a$, control electrode 31 will be returned to cut-off potential, and tube 27 will be cut off. However, capacitor 48 will discharge through resistor 55. After a time determined by the impedances of resistor 55, tube 39 and the value of capacitor 48, capacitor 48 will be discharged sufficiently and the potential of control electrode 51 of device 49 will be returned to a positive value sufficient to cause device 49 to return to conduction. This action will lower the potential on its anode 50 and cause control electrode 43 of tube 39 to return to its cut-off condition, at which time the apparatus will be restored to its initial condition.

The operation just described will result in a square pulse, of a duration determined by the circuit constants, appearing on output terminals $b$ and $c$ in response to each input pulse applied to input terminal $a$. The action of the circuit is such that the initial change in state of tube 49 is quite rapid, and its return to conduction is equally rapid, so that the pulse output is essentially a rectangular wave form. It will be apparent that in a response to a positive input pulse, output terminal $b$ of the unit will go from an initially low value to a more positive value during the output pulse, whereas output terminal $c$ will go from an initially high value to a lower value during the pulse. A set of bipolar outputs is thus provided.

Input terminal $e$ of the monostable unit of FIG. 2 can be employed as a gate input, if so desired, to inhibit the operation of the unit under desired conditions. Input terminal $d$ can be employed to apply a negative reset pulse to control electrode 41, to shorten the output pulse under conditions where it is desirable to do so. These features increase the flexibility of the unit of FIG. 2 as a logical circuit component, but are not employed in the system of FIG. 1.

Figure 3:
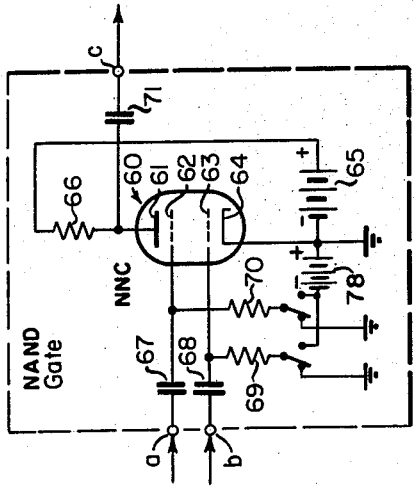
FIGURE 3 is a schematic wiring diagram of an AND gate which can be employed in the system of FIG. 1.

Referring now to FIG. 3, a typical NAND gate suitable for use in the system of FIG. 1 is shown. While many other suitable circuits are known, in which either vacuum tubes or transistors are employed, as shown this gate comprises a single vacuum tube 60 having a pair of control electrodes 62 and 63, a grounded cathode 64, and an anode 61 returned to ground through a voltage dropping resistor 66 and a suitable biasing source 65 as shown. Inputs from input terminal $a$ and $b$ are symmetrical. Input terminal $a$ is coupled to control electrode 62 through a coupling capacitor 67, and the control electrode is returned to ground, or to a suitable negative bias source 78, as required by the desired operating conditions, through a suitable biasing resistor 70. Input terminal b is coupled to control electrode 63 through a coupling capacitor 68, and electrode 63 is returned to ground or to negative bias source 78, as required, through a biasing resistor 69. Output terminal c is coupled to plate 61 through an output coupling capacitor 71. The components are so chosen that tube 60 will normally be biased to cut-off, and an input pulse of predetermined magnitude and with positive polarity applied either to input terminal a or b alone will be insufficient to cause the tube to conduct, but input pulses simultaneously applied to both input terminal a and b will cause the tube to conduit and a negative going output pulse to appear on terminal c. This gate is suitable for use as NAND gates 12, 14, 15 and inhibiting 24 in FIG. 1. While it could also be used for AND gate 13 and inhibiting gate 20 in FIG. 1, by the addition of a phase inverting stage, these gates can be more conveniently made by putting the voltage dropping resistor 66 in FIG. 3 between the cathode and the bias source, and connecting coupling capacitor 71 between output terminal c and cathode 64, to make the gate a cathode follower and cause it to produce a positive pulse output in response to applied positive voltages. As will appear to those skilled in the art, the components of the gate can also be selected so that a positive pulse applied to either input terminal will cause an output unless a negative pulse is applied to the other input terminal to inhibit the output. This construction would be adopted in inhibiting gate 20 in FIG. 1, for reasons which will appear. Inhibiting gates 2 and 25 may be as shown in FIG. 3, but with components selected such that a positive pulse applied to either input terminal will produce a negative output pulse unless a negative pulse is simultaneously applied to the other input terminal.

Figure 4:
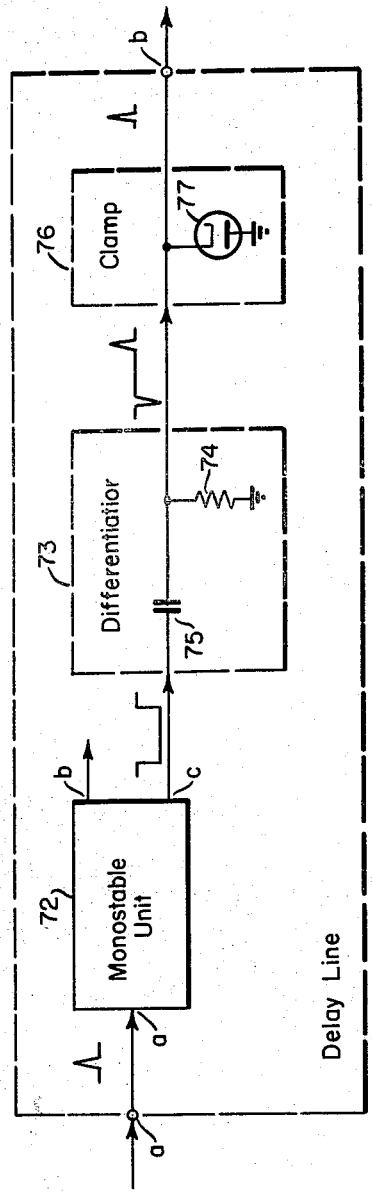
FIGURE 4 is a schematic wiring diagram of a form of delay line which can be employed in the system of FIG. 1.

Referring now to FIG. 4, I have shown a unit suitable for use as a delay line. Of course, many other forms of delay lines are equally suitable for use in the system of FIG. 1. As shown in FIG. 4, the delay line simply comprises a monostable unit 72 of the type shown in FIG. 2 which has its constants selected to produce a pulse output having a duration equal to the desired delay in response to an applied input pulse. The negative going output terminal c of unit 72 is connected to any suitable differentiator 73, here shown as a resistor-capacitor network comprising a resistor 74 and capacitor 75. The output of differentiator 73 will be a pair of pulses corresponding to the leading and trailing edges of the output pulse from unit 72, a negative-going pulse corresponding to the leading edge of the square pulse, and a positive-going pulse corresponding to the trailing edge. The negative-going pulse is discarded in a clamp 76 comprising a diode 77 connected between the output of differentiator 73 and ground, and the positive pulse, corresponding to the input pulse delayed by a predetermined time, appears between the output terminal b of the unit and ground.

Figure 5:
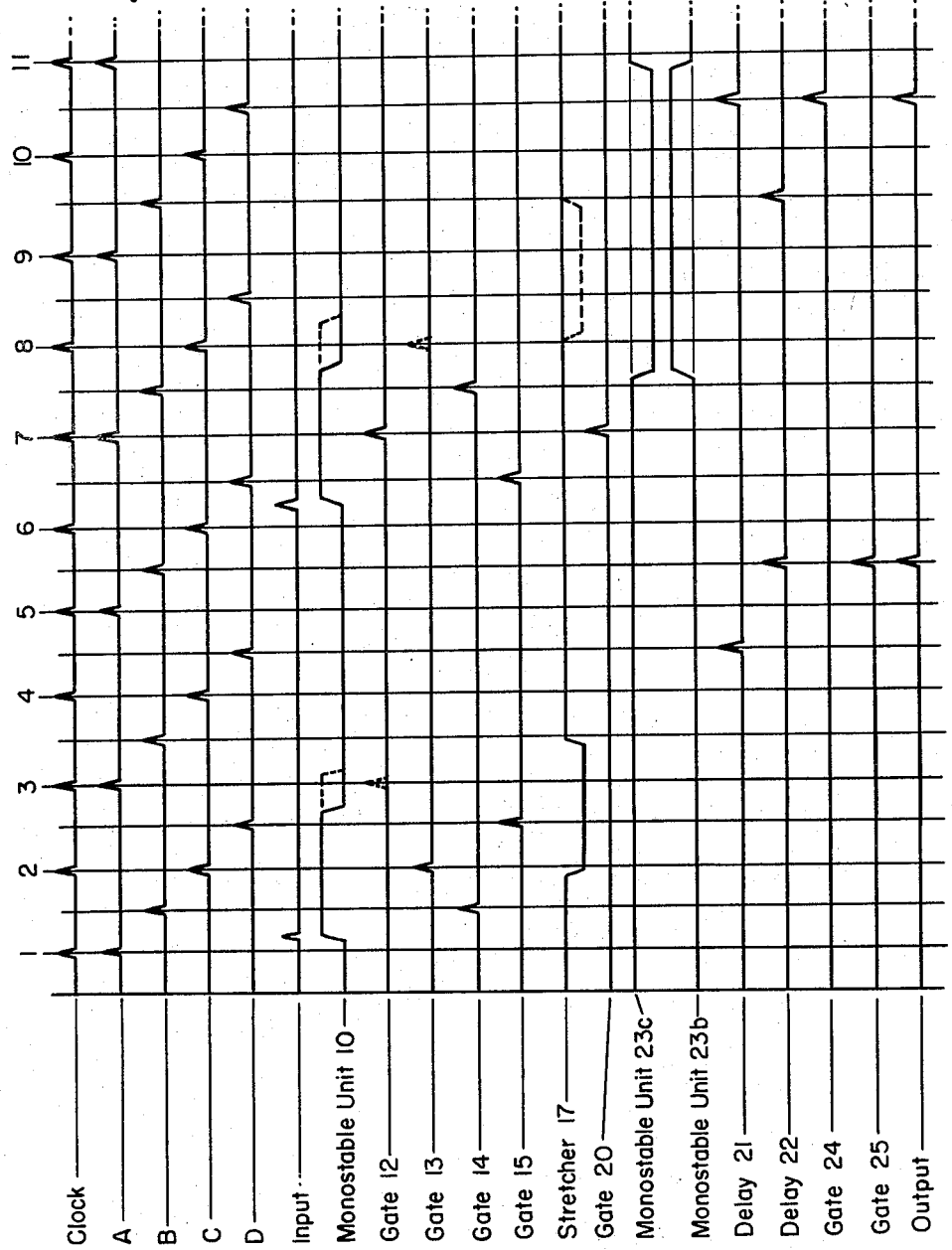
FIGURE 5 is a timing chart showing various relationships between the electric pulses appearing at various points in the system of FIG. 1, and illustrating the typical operation of the system.

Having described the individual components of the system of FIG. 1, the operation of the system will now be described. For this purpose, FIG. 1 should be considered in conjunction with FIG. 5, the latter being a timing chart showing the various pulses produced in the typical operation of the system. As shown in FIG. 5, the clock pulses occur at a fixed frequency or repetition rate. It is desired to produce a fixed stream of pulses A having half the repetition rate of the clock pulses and in fixed phase relation to the clock pulse stream. This stream of pulses is produced by a frequency divider. As shown in FIG. 1, clock pulse generator 1 is connected to inhibiting gate 2. Inhibiting gate 2 is designed as discussed in connection with FIG. 3 such that an applied positive pulse will produce an output pulse unless inhibited by an applied negative pulse. Accordingly, the first pulse applied to terminal a of gate 2 will appear at output terminal c as a negative pulse, which will be inverted in amplifier 3. This pulse is delayed in delay line 4 for T microseconds, corresponding to the period of the clock pulse train; that is, the duration between clock pulses. The output pulse from delay line 4 is applied to a tank circuit 5 which is tuned to a frequency of $f/2$, where $f$ is the repetition rate of the clock pulse train. The output from unit 5 for the individual pulse will be a pulse amplified in cathode following amplifier 6, and this pulse will be inverted in phase inverting amplifier 77 and applied as a negative pulse to input terminal b of inhibiting gate 2 at the same time that the next clock pulse arrives at input terminal a of inhibiting gate 2. The negative pulse will inhibit the operation of the inhibiting gate, and there will be no further action until the next clock pulse arrives, at which time the preceding operation will be repeated. Thus, a train of pulses corresponding to the odd clock pulses and identified as the "A" pulses will appear at the output of cathode follower 6 and be applied to one input terminal of inhibiting gate 12.

Referring again to FIG. 5, a stream of pulses C is desired which correspond to the even clock pulses. This stream is derived by delaying the A pulses in delay line 9 by T microseconds, such that a train of pulses at the frequency of the A pulses and corresponding in phase to the even clock pulses is produced at the output of delay line 9 and applied to one input terminal of AND gate 13. A train of pulses between the A pulses and the C pulses, shown in FIGS. 1 and 5 as the B pulses, is derived from the A pulse train by delay line 7, which is adjusted to produce a delay of $T/2$ microseconds. The output of delay line 7 is connected to one input terminal of NAND gate 14, and is also connected to delay line 8, which has a delay of T microseconds, to produce a stream of D pulses, which as shown in FIG. 5, occur between the C pulse in each group and the next following A pulse.

The operation of the portion of the system next to be described is such that the B pulse of a group will be used to generate an output pulse in response to an applied input pulse if, after the input pulse, an A pulse occurs before a C pulse. However, if a C pulse occurs before an A pulse, the D pulse will be used to generate an output pulse.

Referring to FIGS. 1 and 5, the randomly occurring input pulses are applied to input terminal a of monostable unit 10. This unit is constructed such that a positive pulse of a duration sufficient to span one group of pulses A through D is produced at its output terminal b in response to each input pulse. If so desired, the gain of this unit may be adjusted in gain control 11 as described above, or the output terminal b of unit 10 may be directly conected to the input terminals of NAND gates 12, 14 and 15 and AND gate 13. As will be apparent, the operation of these gates is such that any of pulses A, B, C and D which occur during a pulse from monostable unit 10 will produce a pulse at the output of the associated gate.

Gates 12 and 13 are employed to determine whether, following an input pulse, an A pulse or a C pulse first occurs. If an A pulse first occurs, an output from NAND gate 12 is supplied through phase inverting amplifier 16 to the input of inhibiting gate 20 so that it will produce an output which is applied to the input of monostable unit 23. On the other hand, if a C pulse occurs first, AND gate 13 will produce an input to monostable unit 17, and this unit will produce a negative output at its output terminal c. Unit 17 is designed so that the output pulse will have a duration equal to the duration of the output of unit 10 so that it will inhibit the operation of inhibiting gate 20 for a succeeding A pulse.

Monostable unit 23 has its positive pulse producing output terminal b connected to one input terminal of inhibiting gate 24, and its negative pulse producing output terminal c connected to one input terminal of inhibiting gate 25. Inhibiting gate 24 is constructed to require a positive pulse on both input terminals in order to produce an output pulse. Inhibiting gate 25 is constructed to produce an output pulse in response to an applied positive pulse unless inhibited by an applied negative pulse. Thus, if the A pulse occurs before the C pulse after an input pulse, gate 24 will be opened and gate 25 will be closed. Otherwise, gate 25 will be normally open and gate 24 will be normally closed. The output duration of monostable unit 23 is made sufficient to cover the span of time in which either a B pulse or a D pulse gated by the input and delayed in a manner to be described could be applied to gates 24 and 25, respectively.

The B pulses are gated through NAND gate 14, if they occur during a pulse from unit 10, and are inverted in amplifier 18, and delayed in a delay line 21 which is adjusted to produce a delay sufficient to allow the monostable unit 23 time to be actuated by an A pulse and respond. As a specific example, if a 10 mc. clock stream is employed, the A pulse train would be at a 5 mc. rate, and if monostable unit 23 has a response time of 0.18 microsecond, the delay of units 21 and 22 could be made 0.3 microsecond. The delayed pulse from unit 21 is applied to the lower input terminal of inhibiting gate 24. In a similar manner, the D pulses are gated through gate 15, inverted in amplifier 19, delayed in delay line 22 and applied to the other input terminal of inhibiting gate 25. Depending on whether the A pulse occurs before the C pulse or vice versa, one of gates 24 and 25 produce an output pulse, and this pulse is applied through diode D1 or D2, to output amplifier 26.

FIG. 5 illustrates the overall operation of the system of FIG. 1 in two typical instances. A first input pulse is shown which occurs just after the A pulse associated with clock pulse 1. Monostable unit 10 responds to this pulse to produce an elongated pulse which enables gates 12, 13, 14 and 15 for a time sufficient to span one group of pulses A-D. A B pulse next causes a pulse output from gate 14. This pulse is applied to delay line 21, causing an output pulse after a time interval sufficient to allow monostable unit 23 to respond. Since unit 23 does not respond, however, inhibiting gate 24 is not actuated.

Next, a C pulse is applied to gate 13, causing a pulse to be emitted which is applied to the pulse stretcher comprising monostable unit 17. As shown in FIG. 5, an elongated negative output pulse is produced, which inhibits inhibiting gate 20 to block any following A pulse. This action prevents the actuation of monostable unit 23, so that gate 24 remains closed and gate 25 remains open. A D pulse next causes gate 15 to apply a positive pulse to delay line 22, which responds after a prescribed interval to actuate inhibiting gate 25. Gate 25 then produces a positive pulse which is transmitted through diode D2 to amplifier 26, causing an output pulse to appear which is in a predetermined phase relation to the clock pulse stream. It should be noted that the pulses following the D pulse associated with clock pulse 1 have no effect, because gates 12-15 are closed. However, as indicated by the dotted lines, the duration of the pulse from monostable unit 10 may be sufficient to include the next A pulse without adversely affecting the operation of the system.

The second input pulse illustrated in FIG. 5 occurs just after the C pulse associated with clock pulses 5 and 6. As shown, during the pulse produced by monostable unit 10 in response to this input, a D, an A and a B pulse occur. A C pulse may also occur after the B pulse, as indicated by the dotted lines, without altering the overall operation of the system. The D pulse is applied to delay line 22. Before delay line 22 produces an output, however, gate 12 responds to the A pulse to actuate inhibiting gate 20. The resulting pulse from gate 20 is applied to monostable unit 23, which responds after its inherent delay to produce bipolar output pulses at its terminals b and c, which open inhibiting gate 24 and inhibit inhibiting gate 25, respectively. Thus, the delayed B pulse from delay line 21 actuates AND gate 24 to apply a pulse to amplifier 26, which responds to produce an output pulse, whereas the delayed D pulse finds gate 25 closed and does not produce an output.

It should be noted that whether the output pulse is generated by a B pulse or a D pulse in the system of my invention depends on whether or not monostable unit 23 is actuated. Thus, if an input pulse is applied to unit 10 at a time causing it to respond during either an A pulse or a C pulse, a partial pulse may be transmitted by one of the gates to monostable unit 23. Below a value which will not cause unit 23 to change state, this partial pulse will be ignored, and above this value, which will be determined by the circuit constants, the response will be the same as for a full pulse. Thus, the system will resolve such marginal pulses to produce only one output pulse for each input pulse.

While I have described only one embodiment of my invention in detail, many changes and variations will become apparent to those skilled in the art after reading my description, and such can obviously be made without departing from the scope of my invention.

Having thus described my invention, what I claim is:

1. A pulse retiming system comprising, in combination, a source of clock pulses having a fixed period, means controlled by said clock pulses for generating a first train of pulses corresponding to odd clock pulses, a second train of pulses corresponding to even clock pulses, a third train of pulses having a period equal to the period of said first and second train and delayed with respect to said first train by one half of said fixed period, and a fourth train of pulses having a period equal to the period of said third train and delayed with respect to said second train by one half of said fixed period, a logic gate associated with each pulse train, each gate having a pair of input terminals and an output terminal producing a pulse when and only when pulses are simultaneously applied to both input terminals, means for applying each train to one input terminal of its associated gate, monostable circuit means for producing a pulse having a duration equal to one and one half times said fixed period in response to an applied input pulse, means connecting said monostable unit to the other input terminal of each of said gates, an output amplifier, means controlled by the gates associated with said first and third means for gating the output of the gate associated with said second train to said output amplifier when the gate associated with said first train produces a pulse, and means controlled by the gate associated with said first and third trains for gating the output of the gate associated with said fourth train to said output amplifier when the gate associated with said third train produces a pulse.

2. Apparatus for producing a pulse having a fixed phase relationship with a clock pulse train in response to a randomly occurring input pulse, comprising, in combination, a source of clock pulses having a fixed period, means controlled by said clock pulses for generating a sequence of pulses for each successive pair of clock pulses, monostable means responsive to a randomly occurring pulse for generating a pulse having a duration approximately equal to the duration of each sequence, and means controlled jointly by said sequence generating means and said monstable means for generating an output pulse having a predetermined time relationship to one or the other of each pair of clock pulses according as the sequence occurring during the output of said monstable means belongs to a first or a second set.

3. A non-ambiguous pulse retiming system, comprising, in combination, a source of clock pulses having a fixed period, four ordered logic gates, means controlled by said source for sequentially applying pulses in order to said gates at intervals equal to one half said fixed period, means controlled by an applied input pulse for opening said gates for an interval not less than one and a half times nor greater than two and a half times said fixed period, and means controlled by the sequence of actuation of said gates for producing a pulse in response to the output of said fourth gate or said second gate according as said first gate or said third gate is first actuated.

4. A pulse retiming system, comprising, in combination, a source of clock pulses, means controlled by succeeding pairs of said clock pulses for generating an ordered sequence of pulses in response to each pair of pulses, means controlled by an applied input pulse for generating an elongated pulse having a duration approximately equal to the duration of each sequence, means controlled by said elongated pulse and said sequence for registering the order of the arrival of sequence pulses during said elongated pulse, and means controlled by said registering means for producing an output pulse having a predetermined phase relation to a one of said clock pulses determined by the order of arrival.

5. In combination, first and second logic gates having outputs connected in multiple to an output circuit, first and second sources of pulses, one connected to each gate, means for generating a randomly timed pulse of fixed duration, third and fourth sources of pulses, and means controlled by said generating means and said third and fourth pulse sources for opening said first gate or said second gate according as a pulse from said first source or said second source is first applied to its associated gate during said randomly timed pulse.

6. In combination, first means for periodically generating an ordered sequence of pulses each having a fixed phase relationship to a constant period clock pulse stream, second means responsive to a randomly timed input pulse for generating an elongated output pulse having a duration equal to the period of said sequence, and means controlled by both of said generating means for generating an output pulse in response to a one of said ordered pulses determined by the order of occurrence of the ordered pulses during the elongated pulse.

References Cited by the Examiner
UNITED STATES PATENTS

| | | | |
|---|---|---|---|
| 2,684,442 | 7/54 | Gray et al. | 328—207 |
| 2,688,079 | 8/54 | Wachtell | 328—207 |
| 3,028,552 | 4/62 | Hahs | 328—63 |
| 3,029,389 | 4/62 | Morphet | 328—63 |
| 3,112,450 | 11/63 | Krause | 328—109 |

ARTHUR GAUSS, *Primary Examiner.*

GEORGE N. WESTBY, *Examiner.*

UNITED STATES PATENT OFFICE
CERTIFICATE OF CORRECTION

Patent No. 3,189,835                                                June 15, 19

Lynn W. Marsh, Jr.

It is hereby certified that error appears in the above numbered patent requiring correction and that the said Letters Patent should read as corrected below.

Column 2, line 40, for "a NAND gate 13" read -- an AND ga 13 --; column 5, line 13, for "conduit" read -- conduct --; column 7, line 74, for "AND" read -- inhibiting --.

Signed and sealed this 21st day of December 1965.

(SEAL)
Attest:

ERNEST W. SWIDER
Attesting Officer

EDWARD J. BRENNER
Commissioner of Patents